United States Patent [19]
Abdelmesih

[11] Patent Number: 6,050,246
[45] Date of Patent: Apr. 18, 2000

[54] METHOD AND DEVICE FOR CONVERTING CONVENTIONAL GAS ENGINES TO OPERATE ON COMPRESSED NATURAL GAS

[76] Inventor: Saad Abdalla Abdelmesih, 36 B Rd 206 Digla Maadi, Cairo, Egypt

[21] Appl. No.: 08/787,674

[22] Filed: Jan. 23, 1997

[51] Int. Cl.[7] .................................................. F02M 21/04
[52] U.S. Cl. ............................................................ 123/527
[58] Field of Search .............................................. 123/527

[56] References Cited

U.S. PATENT DOCUMENTS

| | | | |
|---|---|---|---|
| 5,375,582 | 12/1994 | Wimer | 123/528 |
| 5,377,646 | 1/1995 | Chasteen | 123/527 |
| 5,474,053 | 12/1995 | Suzuki | 123/527 |
| 5,699,767 | 12/1997 | Notsu et al. | 123/527 |

*Primary Examiner*—John Kwon
*Attorney, Agent, or Firm*—Cristina M Offenberg

[57] ABSTRACT

A method and device for converting conventional engines to a natural gas fueled engine, having a means of withdrawing compressed natural gas from a storage supply at a low pressure, combining the natural gas with atmospheric air from the engine's air cleaner, pressurizing the air and gas mixture by means of a convergent-divergent nozzle and allowing the air/gas mixture to enter the engine's induction manifold at high pressure. This is accomplished without modification to the original engine cylinder, while increasing the engine power and minimizing exhaust emissions.

6 Claims, 3 Drawing Sheets

METHOD AND DEVICE FOR CONVERTING CONVENTIONAL GAS ENGINES TO OPERATE ON COMPRESSED NATURAL GAS

BACKGROUND

1 Field of Invention

This invention relates to gas engines, specifically to an improved device to convert gas engines to operate on compressed natural gas. The present invention provides a novel system for increasing output power of compressed natural gas engines. The invention can be applied on dedicated, duel diesel, bi-fuel spark ignition, and four or two stroke gas engines.

2. Description of Prior Art

Currently the conversion of conventional engines to natural gas fueled engines is accomplished by modifying the existing engine. These methods are associated with loss of engine power, significant design modification, difficulty in optimizing operation, requirements necessitating adjustments of engine valve timing, complex additions to engine design, increases to engine weight and an overall rise in maintenance costs. Additionally, such systems do not provide for safety shutdowns when using natural gas. The prior art systems also provide a wide range of air to fuel ratios to meet the changing demand of speed and torque which cause exhaust emissions to exceed acceptable limits.

The present invention draws from a method used in steam generation, fluid injection, and combustion engineering fields. No prior art device has successfully addressed the application of such systems to an internal combustion engine. In several patents, the energy generated by the pressure of the gas inside the storage cylinders is used to improve engine performance. No patents use this energy to induce more air into the engine thereby allowing more fuel to burn and increasing engine power output as the present invention discloses.

Yul et al. U.S. Pat. No. 5,329,908 discloses a gas fuel injector with a gas accumulator. The electronically controlled system provides a variable fuel injection timing inside the engine cylinder. The injection timing varies from near the top dead center as in a diesel engine to near the bottom dead center, as in a gasoline engine. The system is designed mainly to maintain high efficiencies under variable supply pressures inside the storage tanks. The main deficiency of this invention is the added complexity to the engine design.

In U.S. Pat. No. 5,067,467 of Hill et al. a device is disclosed for compressing and injecting gaseous fuel from a variable pressure supply. The device utilizes energy from the gas in the engine chamber or from an external compressor to raise the pressure of the natural gas fuel needed for injection. The system is designed to compensate for decreasing supply pressures caused by the natural gas being consumed by the engine. This invention varies from the present invention because the subject invention uses the high pressure of the raw natural gas stored inside the cylinders to push more air to the engine. Thus the decrease in the storage supply pressure will not affect the performance of the engine as in Hill et al.

The U.S. Pat. No. 5,315,981 of Ning et. al. discloses a method for converting a diesel engine to a natural gas engine using a new cam profile to cause an early closure of the intake valve thereby reducing the engine's maximum pressures while using a conventional blower for air supply. This method is not efficient because it reduces the amount of air to gas mixture charged to the engine. Whereas, the subject invention increases the amount of air to gas mixture and thereby increases the power output of a gasoline engine or a naturally aspirated diesel engine when converted to use with compressed natural gas instead.

U.S. Pat. No. 5,203,305 discloses a system that uses an electronic translator to convert conventional fuel injector control signals to alternative gaseous fuel injectors. U.S. Pat. No. 5,228,423 relates specifically to duel-fuel gasoline engines. This invention discloses an improved intake passage and appropriate lift of the intake valves to minimize deviation in engine performance when switching from one fuel to another. U.S. Pat. No. 5,450,832 discloses a duel fuel system able to utilize the original electronic fuel injection design to regulate and deliver compressed natural gas. U.S. Pat. No. 5,325,894 discloses a method for fueling vehicles with liquefied natural gas after it has been warmed up in a heat exchanger. U.S. Pat. No. 5,408,957 relates to a gas injection system for conventional reciprocating or rotary internal combustion engines or turbines. All of these inventions are designed to minimize the loss in power when switching from conventional fuels to natural gas or to regulate the fueling systems. However, not one of them has any similarity to the subject invention in where engine power is increased by using the available compressed natural gas energy to "supercharge" the engine. In all the above-mentioned patents, there is no disclosure of a method of handling the essential problem of how to compensate for engine power loss when using compressed natural gas instead of liquid fuels. The present invention describes a method to increase engine power and improve engine performance by pressurizing the fluid flow (air) and by using the kinetic energy of another fluid (natural gas).

OBJECT AND ADVANTAGES

Accordingly, in addition to the objects and advantages of the conversion device described above, several more objects and advantages associated with the present invention are:

a.) to increase engine power;

b.) to convert the engine with no modification to the original engine cylinder, head, pistons or valve timing;

c.) to adapt a four stroke, two stroke, compression, or spark ignition diesel engine to a natural gas engine;

d.) to adapt a bi-fuel spark ignition engine and pilot ignition duel-fuel diesel engine to a natural gas engine, e.) to be capable of converting the engine within the physical restrictions and orientation of the vehicle's engine;

f.) to be capable of providing a precise and pressurized air to fuel (gas) mixture strength;

g.) to minimize exhaust emissions while meeting variable demands of engine speed and torque;

h.) to replace the conventional turbo-charger engines; and i.) to replace the conventional gas carburetor/mixer engines.

Further objects and advantages of the patent applicant's invention will become apparent from a consideration of the drawings and the ensuing description.

DRAWING FIGURES

In the drawings, closely related figures have the same number but different alphabetic suffixes.

DESCRIPTION

Figure 1:
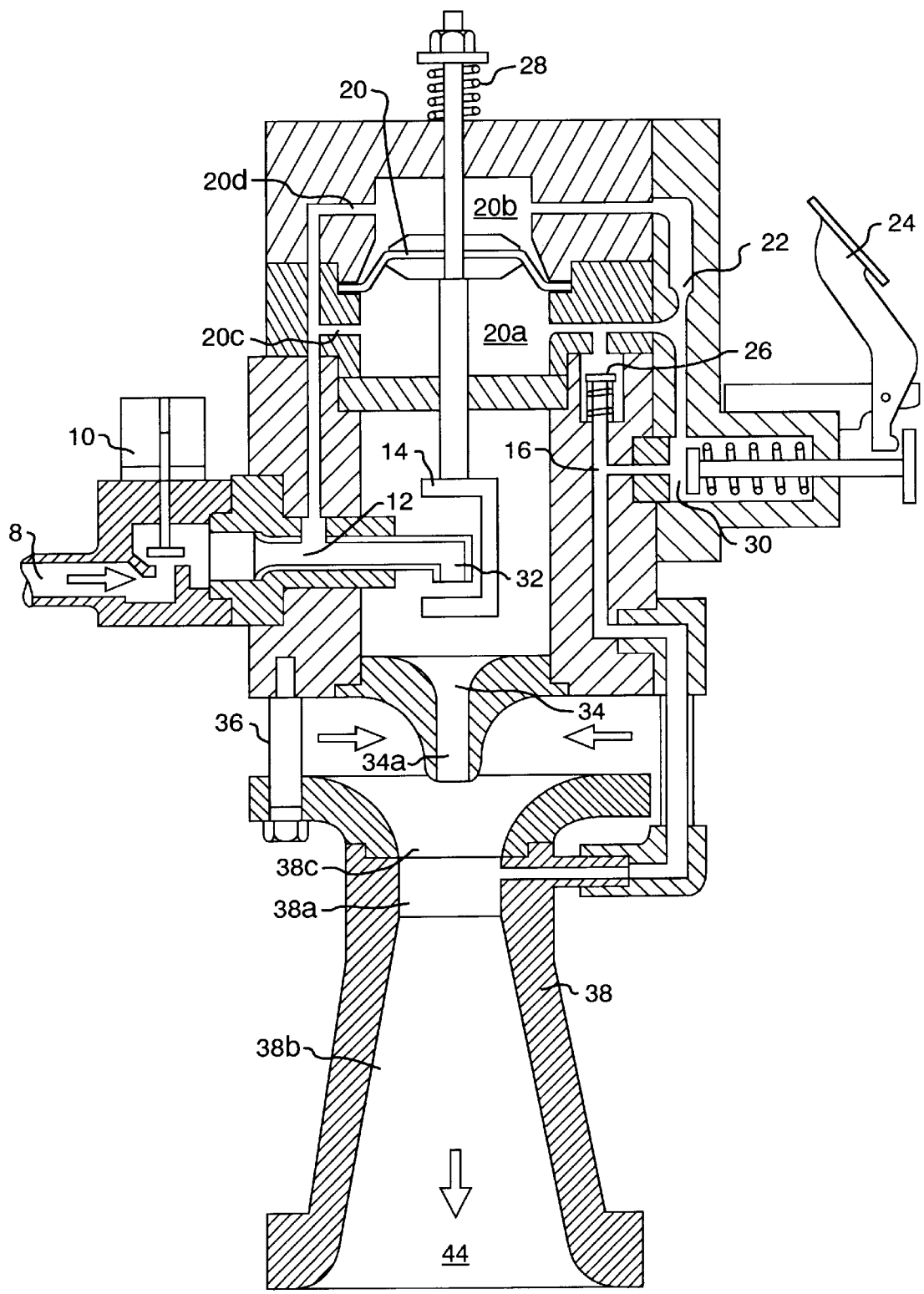
FIG. 1 is a perspective view of the subject invention.

A typical embodiment of the present invention is shown in FIG. 1. FIG. 1 illustrates a perspective view of a basic version of the natural gas converter. The natural gas converter comprises a solenoid valve (10) connected to the natural gas dispenser (12) which is connected to the diaphragm (20). The diaphragm is comprised of a lower chamber (20a) and an upper chamber (20b). The natural gas dispenser (12) is connected to the chambers (20a and 20b) by way of the lower chamber vent (20c) and the upper chamber vent (20d), respectively. The diaphragm (20) is controlled by the control arm (14) of the main gas flow valve (32) and the spring (28). The upper chamber of the diaphragm (20b) connects to the throttling restriction vent (22) which is connected to the modulating control valve (30). The lower chamber of the diaphragm (20a) connects to both the modulating control valve (30) and the small ball valve (26) by way of two different directions. Both the small ball valve (26) and the modulating control valve (30) connect to the convergent-divergent venture (38). The natural gas dispenser (12) also connects to the main gas flow valve (32). The main gas flow valve (32) connects to the convergent nozzle (34), The convergent nozzle (34) connects to the convergent-divergent venture (38) by way of an air passage (37) space. The convergent-divergent venture is comprised of a convergent inlet (38c), convergent-divergent venture throat (38a) and a divergent diffuser part (38b). The convergent-divergent venture leads to the engine induction manifold (40).

Figure 2:
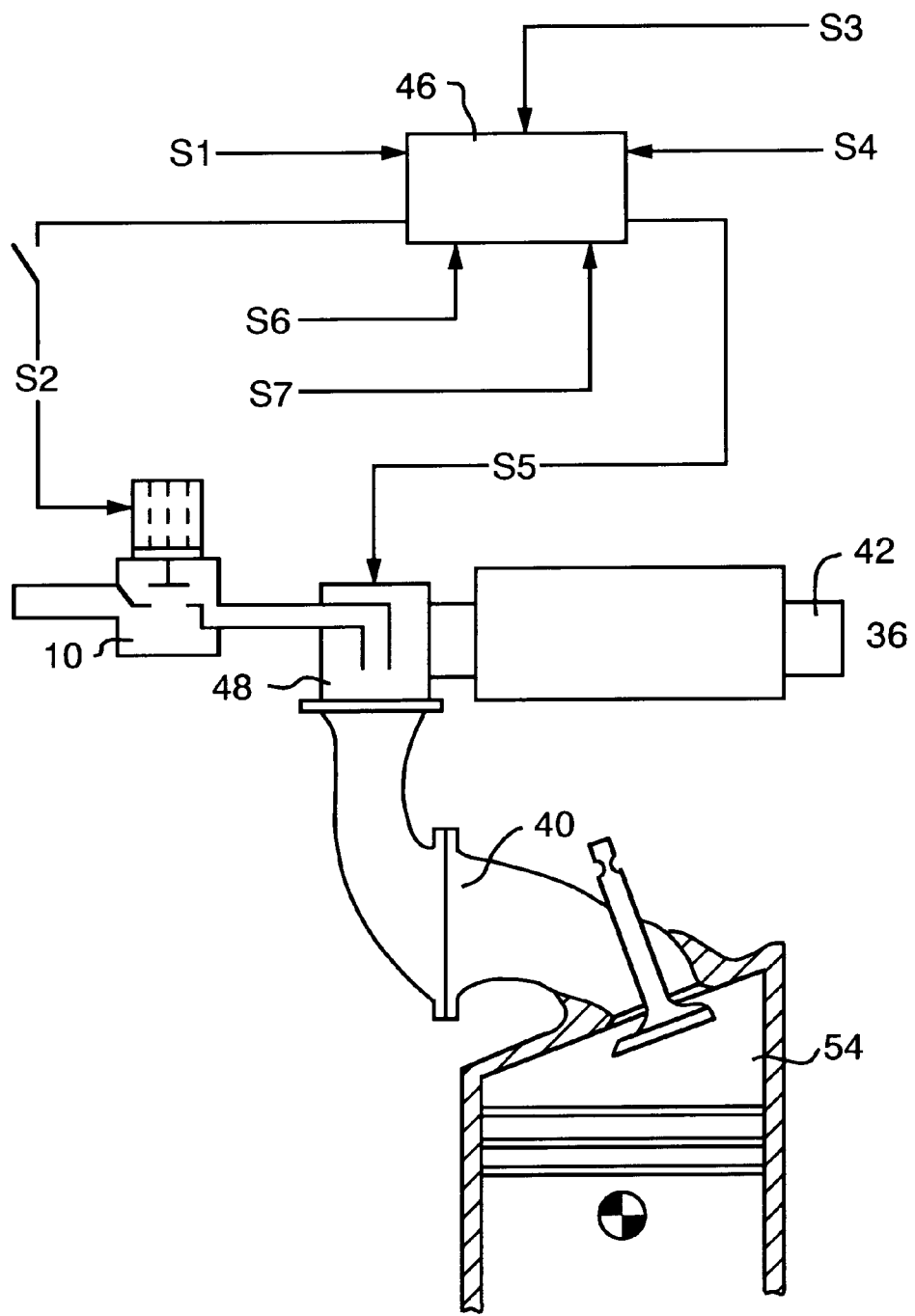
FIG. 2 is a block diagram of a gas fueled engine adapted with the subject invention.
Figure 3:
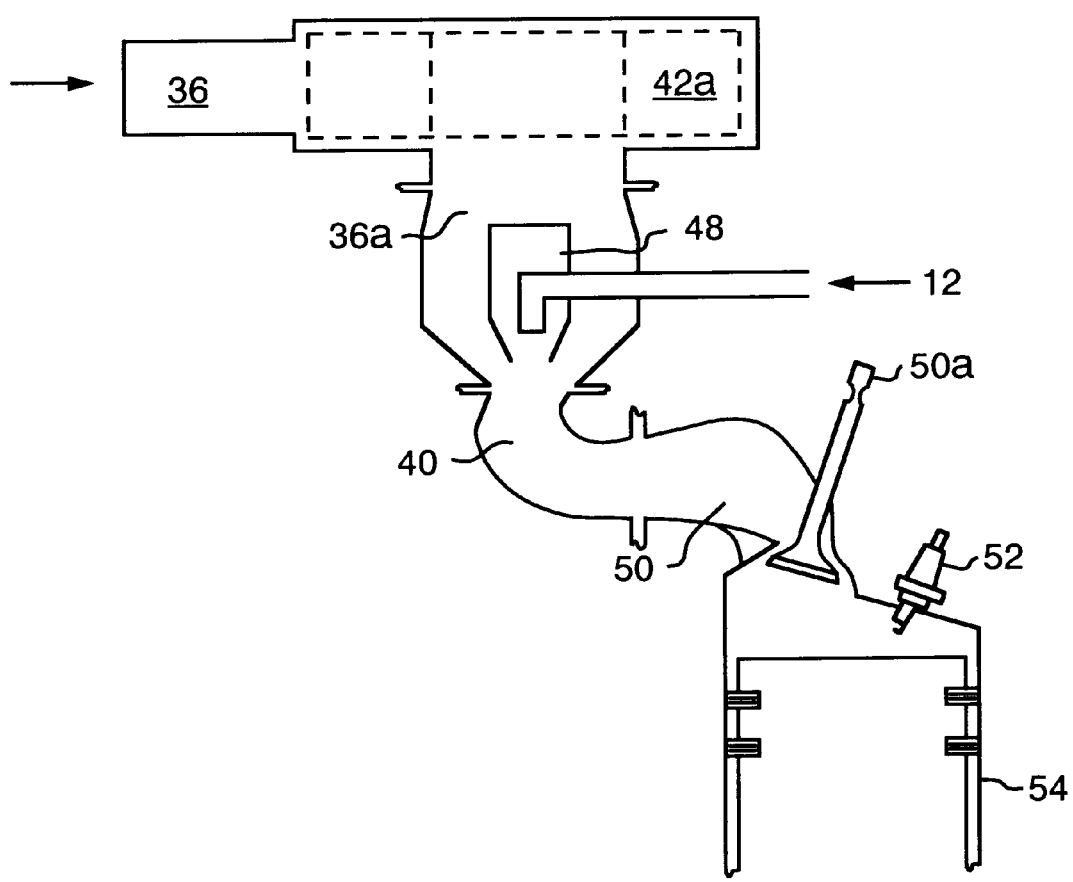
FIG. 3 is a schematic diagram of an engine adapted with the subject invention arranged to fit in a specific engine orientation between the air cleaner and the induction manifold.

Additional embodiments are shown in FIGS. 2 and 3 and in each case the natural gas converter is shown.

FIG. 2 is a block diagram representing a gas fueled engine adapted with the gas converter invention (48) and connected to the compressed natural gas delivery system and an electronic control unit (46). The electronic control unit (46) is connected with appropriate sensors as described as follows: an input signal (S1) from the engine induction manifold (40) transmits to the electronic control unit (46). An "okay" output signal (S2) from the electronic control unit (46) transmits the signal to allow compressed natural gas to flow to the gas converter invention (48). An input signal (S3) from the engine speed sensor transmits to the electronic control unit (46). An exhaust temperature input signal (S4) transmits to the electronic control unit (46). An output signal (S5) from the electronic control unit (46) transmits to the modulating control valve (30) or to the control arm of the main gas flow valve (14) of the gas converter invention (48). An output signal (S6) from the natural gas flow sensor transmits back to the electronic control unit (46). Finally, the exhaust oxygen sensor (S7) transmits back to the electronic control unit (46).

FIG. 3 is a schematic layout of an engine adapted with the gas converter invention (48) and arranged to fit in a specific engine orientation between the air cleaner and the induction manifold. The engine induction manifold (40) is below the gas converter invention (48) which is located within the atmospheric intake duct (36a). The air filter (42a) is connected to the atmospheric air intake duct (36a). The natural gas dispenser (12) is connected to the gas converter invention (48). The engine inlet valve (50a) is the inlet of the engine intake (50) which is connected to the engine induction manifold (40). The spark plug (52) is connected to the engine (54).

OPERATION

With reference to the drawings, the preferred embodiment of the present invention is hereby described. The manner of using the natural gas converter to convert conventional gas engines to operating on natural gas is outlined in the following paragraphs:

The natural gas converter for compressed gaseous fueled engines has a means to supply gas under a relatively low pressure of about three to four atmospheres or less (depending on the encountered flow losses and turbulence in the system). The gas supply pressure is regulated by single or multi-stage regulator to reduce pressure from 200 bar at storage to a sustained value of about 3–4 bar before injection in the engine induction manifold. The reduced pressure must not exceed a predetermined value depending on the encountered losses in the system and is practically limited not to result in a change of total pressure being no greater than 1.5 bar at the beginning of the compression stroke.

When starting the engine, the solenoid valve (10) is switched open. The main flow of natural gas (8) flows past the solenoid valve (10) into the natural gas dispenser (12). The natural gas dispenser (12) feeds the natural gas converter with pressurized natural gas. The natural gas dispenser (12) is adjusted by the main gas flow valve (32) which is fixed to a control arm (14). When there is no pressure is on the diaphragm (20), a spring (28) holds the main gas flow valve (32) closed tight, consequently, no flow of gas goes through the main gas flow valve (32). The natural gas dispenser feeds the high pressure natural gas (8) into the upper chamber of the diaphragm (20b) and the lower chamber of the diaphragm (20a). The high pressure gas is allowed to flow to the upper chamber of the diaphragm (20b) by way of the upper chamber diaphragm vent (20d) and allowed to flow to the lower chamber of the diaphragm (20a) by way of the lower chamber diaphragm vent (20c). The differential pressure above and below the diaphragm (20) influences the opening of the main gas flow valve (32) and consequently the flow rate of compressed natural gas. The main gas flow valve (32) is controlled by the spring (28). The spring (28) is affected by the differential pressure above and below the diaphragm (20). When the pressure on the upper chamber of the diaphragm (20b) is higher than the pressure on the lower chamber of the diaphragm (20a), then the spring (28) compresses and allows the main gas flow valve (32) to open. When the main gas flow valve (32) is open, the main flow of natural gas (8) flows through the natural gas dispenser (12) and through the convergent nozzle (34).

As natural gas flows through the convergent nozzle (34) it drags air from the air cleaner (42) and pushes it into the convergent-divergent venture (38). The convergent nozzle's (34) throat exit area is sized to allow unchoked gas to flow at a rate to meet the maximum engine power demand. Atmospheric air (36) is drawn from the engine air cleaner (42) to the air passage (37) creating an air and gas mixture (44). The flow areas of the convergent nozzle outlet (34a) and the air passage (37) are designed to provide an air to fuel mixture ratio in the range between 19:1 to 26:1 over a specified range of engine speed from idle to full power. The air and natural gas mixture (44) is injected into the convergent-divergent venture (38) where the flow of the air and gas (44) decelerates due to the shape of this venture (38) and thus causing an increase in the pressure of the air and gas mixture (44). The convergent-divergent venture throat is sized to handle the total mass of the air and gas mixture (44). The convergent-divergent venture (38) delivers the pressurized air and gas mixture (44) to the engine induction manifold (40) where it is used to run the engine.

When the engine starts, a vacuum in the convergent-divergent venture throat (38) is created. The vacuum force in the convergent-divergent venture throat (38a) opens the small ball valve (26) and so reduces the closing force acting on the main gas flow valve (32). The small ball valve (26) is spring loaded and is located in such a way so as to allow the secondary flow of natural gas (16) from the diaphragm (20) to bypass the modulating control valve (30) during engine startup and when the engine is idling. The small ball valve (26) is normally closed when the engine is not running but is fully opened during startup of the engine. The spring loaded small ball valve (26) opens only when the engine suction or vacuum is created in the convergent-divergent venture throat (38a) and when a modulating control valve (30) is in the closed position.

The modulating control valve (30) controls the main flow of natural gas (8) from the main gas flow valve (32) to any desired degree. The modulating control valve (30) also controls the pressure difference between the upper chamber of the diaphragm (20b) and the lower chamber of the diaphragm (20a). A throttling restriction vent (22) decreases the secondary natural gas flow (16) to lower the pressure below the diaphragm (20a) thereby creating sufficient force to open the main gas flow valve (32). As the modulating control valve (30) opens, the opening force acting on the diaphragm (20) increases and overcomes the closing spring's (28) force. As the main stream of natural gas (8) flows through the convergent nozzle (34) it drags in atmospheric air (36) creating the air and gas mixture (44) which is injected into the engine induction manifold (40).

At the pressure equilibrium point between the upper chamber of the diaphragm (20b) and the lower chamber of the diaphragm (20a), the main gas flow valve (32) is in balance from opening and closing. This balance maintains the main gas flow valve (32) partially open but allows for immediate adjustments in response to compensate for any change in the modulating control valve (30). The modulating control valve (30) is controlled by a foot pedal (24) mechanism or by an electronic control unit (46). A mechanical attachment can be used to regulate the operation of the modulating control valve (30), or electronic signals from an electronic control unit can also be used to limit the opening of the modulating control valve (30) after it has been translated to mechanical effect. For a specific engine design of power, speed, and configuration, the invention can be of various designs and shape to satisfy these requirements.

FIG. 2 illustrates the function of the electronic control unit (46) in relation to engine operation. The electronic control unit (46) receives electronic signals from a pressure sensor (S1) located in the engine induction manifold (40). An engine speed sensor (S3) is located on the engine camn gear. The gas temperature sensor (S4) is located in the exhaust. These sensors are controls to limit and prevent the engine from exceeding predetermined maximum permissible values of boost pressure, speed, and exhaust temperature. In response to these signals the electronic control unit (46) provides an output signal (S5) to the gas converter invention (48) to reduce the gas flow. The mass flow sensor (S6) is located in the gas line just before the gas converter, and the oxygen sensor (S7) is in the exhaust gas line. The electronic control unit (46) uses these two signals (S6 and S7) to calculate the actual air to fuel ratio of the air and gas mixture (44). This calculation is then integrated into a desired ratio for optimum emission level. The result is then translated into output signal (S5) to adjust the position of the modulating control valve (30) to increase or decrease the gas flow. Also, the electronic control unit (46) provides an on and off signal (S2) for start and stop controls and also for emergency shut off.

FIG. 3 shows one way of installing the invention (48) in the air passage between air cleaner (42) and engine induction manifold (40). As the engine intake valve (50a) opens, the engine suction draws atmospheric air (36) into the engine intake (50) through an air passage. The natural gas supply line (12) provides gas under pressure at about 3–4 bars to the natural gas converter (48), as gas is injected into the engine, it drags more atmospheric air (36), thereby increasing pressure. The turbulence which is created promotes the mixing of the natural gas and the air (44). The homogeneous mixture is added to the engine cylinder.

From the description above, a number of advantages of my invention become evident, namely:

a.) to increase engine power;

b.) to convert the engine with no modification to the original engine cylinder, head, pistons or valve timing;

c.) to adapt a four stroke, two stroke, compression, or spark ignition diesel engine to a natural gas engine;

d.) to adapt a bi-fuel spark ignition engine and pilot ignition duel-fuel diesel engine to a natural gas engine;

e.) to be capable of converting the engine to the physical restrictions and the orientation of the vehicle's engine;

f.) to be capable of providing a precise and pressurized air to fuel (gas) mixture strength;

g.) to minimize exhaust emissions while meeting variable demands of engine speed and torque;

h.) to replace conventional turbo-charger engines; and i.) to replace conventional gas carburetor/mixer engines.

CONCLUSION, RAMIFICATIONS, AND SCOPE

Accordingly, the reader will see that the natural gas conversation method of this invention can be used to convert conventional gas engines to operate on natural gas with increased engine power and engine performance. All this is accomplished without engine cylinder modification, with minimal exhaust emissions, and with a capability of providing a precise and pressurized air and fuel mixture. This invention has the additional advantages in that:

*it increases engine power

*it requires no engine cylinder, head, pistons or valve timing modifications

*it is adaptable to four stroke, two stroke, compression or spark ignition engines

*it is adaptable to bi-fuel spark ignition engines or pilot ignition duel-fuel diesel engines

*it is capable of providing a precise and pressurized air and fuel mixture strength

*it allows for minimal exhaust emissions while meeting variable demands of engine speed and torque

*it replaces the conventional turbo-charger engines

*it replaces the conventional gas carburetor and mixer engines.

Furthermore, this invention will have a wide range of applications in internal combustion gas engines (mobile and stationary). It can be used for converting conventional, naturally aspirated, internal combustion engines to use natural gas. The invention can be applied to bi-fuel spark ignition engines and in duel fuel diesel engines using diesel fuel for pilot ignition. In the case of supercharged diesels, the invention can replace the present turbocharger. It can also replace the conventional gas mixers/carburetor engines used in naturally aspirated spark ignition engines.

While the above-outlined description contains many specifics, these should not be contrued as limitations on the scope of the invention, but, rather as an exemplification of one preferred embodiment thereof. Many other variations are possible. For example, for a specific engine application the invention can be of a single unit system or of multi-unit working in parallel in a common rail design. In the common rail design, the pressurized mixture is delivered by more than one unit (invention) into a common rail connected to the engine intake manifold. The invention as it handles only gaseous fluids, can be installed in a vertical, horizontal or at an angle position with respect to the engine. In the common rail design, metering of the fuel gas can be controlled more efficiently to meet variable power and speed demands. One or more units can be switched on or off for maximum power or partial load requirements. Switching of the invention units through valve (10) can be done automatically and/or by manual override. To supply additional fuel for sudden acceleration, a high degree of response can be obtained by using direct mechanical linkage from the foot pedal (24) to open the main gas valve (32). The mechanism will only work when sudden pressure is exerted on the foot pedal. Accordingly, the scope of the invention should be determined not by the embodiments illustrated, but by the appended claims and their legal equivalents.

What is claimed is:

1. A method for converting conventional engines to a natural gas fueled engine by a natural gas converter comprising:
   a means for withdrawing compressed natural gas from a storage supply through an on-off valve and through a natural as dispenser to a main gas flow valve, combining said compressed natural gas with atmospheric air induced from an engine air cleaner thereby making an air/gas mixture, pressurizing said air/gas mixture by passing the air/gas mixture through a convergent-divergent venture; and allowing the air/gas mixture to then enter the engine manifold,
   wherein the flow of the compressed natural gas is regulated by the combination of valve mechanisms and a pressure-actuated diaphragm having an upper and a lower chamber,
   wherein a difference in pressure in said upper and said lower chamber of said diaphragm controls the opening and closing of said main gas flow valve which regulates the flow of compressed natural gas to a convergent nozzle.

2. A method according to claim 1 wherein the natural gas drags atmospheric air from an air cleaner into an air passage between said convergent nozzle and a convergent-divergent venture creating an air/gas mixture due to the natural gas having a high velocity as a result of the expansion of high pressure natural gas in the convergent nozzle.

3. An apparatus for converting conventional engines to a natural gas fueled engine by a natural gas converter comprising:
   a conduit carrying high pressure natural gas into a natural gas converter;
   said conduit leads a primary gas flow to a main gas flow valve and a secondary gas flow a diaphragm having an upper chamber and a lower chamber;
   said upper chamber of the diaphragm and the lower chamber of the diaphragm receive the high pressure natural gas from said conduit through chamber vents;
   said upper chamber of the diaphragm connects to a throttling restriction vent which leads to a modulating control valve;
   said lower chamber of the diaphragm connects to a ball valve which also leads to the modulating control valve;
   said main gas flow valve is regulated by a control arm;
   said control arm is regulating the opening of the main gas flow value on one end and connected to a spring on the other end and said control arm is actuated by the difference in pressure between the upper chamber and the lower chamber of the diaphragm;
   said main gas flow valve regulates the flow of natural gas to a convergent nozzle;
   said convergent nozzle accelerates natural gas flow into air passage space while dragging in atmospheric air before entering a convergent-divergent venture.

4. An apparatus according to claim 3 in which a small ball valve is spring loaded and is located to allow the secondary flow of natural gas from said diaphragm to bypass a valve which modulates gas flow during engine start up and when the engine is idling; this small valve opens when the engine suction is created in the convergent-divergent venture.

5. An apparatus according to claim 3 in which a modulating control valve modulates the main flow of a natural gas to any degree by differential pressure between the upper chamber and lower chamber of the diaphragm and said modulating control valve is controlled either by mechanical or hydraulic means.

6. An apparatus according to claim 3 in which at equilibrium point of the pressure between the upper chamber and lower chamber of the diaphragm the main gas flow valve is in balance from opening and closing.

* * * * *